United States Patent [19]

Legrand

[11] Patent Number: 4,582,391
[45] Date of Patent: Apr. 15, 1986

[54] OPTICAL SWITCH, AND A MATRIX OF SUCH SWITCHES

[75] Inventor: Jacques Legrand, Suresnes, France
[73] Assignee: Socapex, Suresnes, France
[21] Appl. No.: 480,125
[22] Filed: Mar. 29, 1983

[30] Foreign Application Priority Data

Mar. 30, 1982 [FR] France .............................. 82 05440

[51] Int. Cl.⁴ ................................................ G02B 5/14
[52] U.S. Cl. ............................ 350/96.20; 350/96.15; 350/267
[58] Field of Search ................. 350/96.15, 96.20, 267, 350/280

[56] References Cited

U.S. PATENT DOCUMENTS 3,572,896  3/1971  Bertram .............................. 350/160
3,876,288  4/1975  Iwata et al. ......................... 350/267

FOREIGN PATENT DOCUMENTS 533900  10/1976  U.S.S.R. ............................. 350/267

OTHER PUBLICATIONS

Applied Physics Letters, vol. 40, No. 1, Jan. 11, 1982, New York 9 (US), J. L. Jackel et al., "Electrowetting Optical Switch", pp. 4–6.

Primary Examiner—William L. Sikes
Assistant Examiner—Akm E. Ullah
Attorney, Agent, or Firm—Cushman, Darby & Cushman

[57] ABSTRACT

A light ray (6) passes through a light-passing region of a transparent wall (1). Adjacent to said light passing region there is a wettable drop-receiving region (4,5) with a liquid (7,8) thereon. A moving member (11,12) has a rest position in which the liquid is free to occupy only the wettable drop-receiving region, and a working position in which it moves at least a portion of the liquid onto the light-passing region, thereby modifying the light ray (6). Various kinds of switches, such as an on-/off switch or a deflector switch, can be devised by suitable choice of the liquid (e.g. its refractive index, or its reflecting properties), and the angle of incidence of the light ray (6). The moving member may be controlled electromagnetically.

12 Claims, 25 Drawing Figures

FIG_6 (a)

FIG_6 (b)

FIG_7(a)

FIG_7(b)

FIG_8(a)

FIG_8(b)

FIG_8(c)

FIG_8(d)

FIG_10 (a)

FIG_10 (b)

FIG_11

OPTICAL SWITCH, AND A MATRIX OF SUCH SWITCHES

The present invention relates to an optical switch, ie. to a device which is capable either of temporarily blocking a light signal, or else of selectively deflecting it. Such a light signal is typically one which is propagating along an optical fiber with the optical switch located at an exit from the fiber. Such a switch may block the light by absorbing it or by reflecting it back along the fiber, alternatively it may deflect the light in various predetermined directions, eg. to cause it to propagate along a selected optical fiber.

BACKGROUND OF THE INVENTION

Existing switches operate by mechanically moving parts on which mirrors or prisms, etc... are mounted.

Such mechanical systems suffer from the need for the moving parts to be adjusted highly accurately so that the light beam is deflected with precision. Not only does the rest position of the moving parts need adjusting with accuracy, the travel and the working position at the end of the travel also need to be adjusted accurately.

In addition to the considerable technological difficulties involved in meeting such requirements, the required accuracy leads to the resulting systems being expensive. Further, there is no guarantee that such systems will remain accurately adjusted over a period of time.

Preferred embodiments of the present invention provide an optical switch which avoids the need for such accurate adjustments, and which is therefore cheap to produce and reliable.

The invention also provides a matrix of such switches.

SUMMARY OF THE INVENTION

The present invention provides an optical switch comprising: a transparent wall having a light-passing region capable of passing an incident ray of light, and a drop-receiving region adjacent to, but not including, said light-passing region; a drop of liquid received on said drop-receiving region, the drop-receiving region being wettable by said liquid; and a moving member selectively movable between a rest position and a working position, said drop remaining on the drop-receiving region and avoiding the light-passing region when said moving member is in its rest position, and at least a portion of said drop being applied to the light-passing region by said moving member when in its working position, thereby causing the propagation of the incident light ray to be modified by the ray encountering the liquid.

The transparent wall may have a raised region adjacent to the wettable drop-receiving region along at least one of its edges not adjacent to the light-passing region, the raised region can then serve both as a stop for the moving member in its working position, and as a guide for directing the liquid towards the light-passing region.

The moving member may be a moving plate having a transparent region on the path of the light ray.

The plate may have a region of magnetic material thereon, in which case the switch includes electro-magnetic control means for moving the moving plate between its rest and working positions.

The transparent region of the moving plate may be a central region thereof, and in its rest position, the moving plate can then rest on at least two drops of the liquid situated on either side of said transparent central region. Also when in its rest position, an opposite face of the plate may come into contact with a second transparent wall which, together with said first mentioned transparent wall, constitutes a housing around the moving plate.

The wettable drop-receiving region may be completely surrounded by a raised region of the wall, except for a channel interrupting the raised region, into which channel the liquid penetrates when the moving member is in the working position.

The liquid may be a reflecting liquid, and the switch may include means for directing at least one incident light ray perpendicularly to the transparent wall, thereby constituting an optical on/off switch. Alternatively, the switch may include means for directing at least one incident light ray at a given angle other than perpendicularly to the transparent wall, thereby constituting an optical deflector function.

In another configuration, the switch may include means for directing at least one incident light ray at a given angle other than perpendicularly to the transparent wall so that the ray is subject to total reflection on the wall, and the liquid should then have an index of refraction such that when the moving member is in the working position, at least a portion of the light ray is transmitted. The moving member may then have a light ray exit face perpendicular to the incident direction of the light ray.

The invention also provides a switch matrix comprising a plurality of optical switches as defined above disposed one after the other along the path of an incident light ray.

BRIEF DESCRIPTION OF THE DRAWINGS

Embodiments of the invention are described by way of example with reference to the accompanying drawings, in which:

FIGS. 9a and 8b are vertical sections through an embodiment of the invention using total internal reflection;

MORE DETAILED DESCRIPTION

Figure 1A:
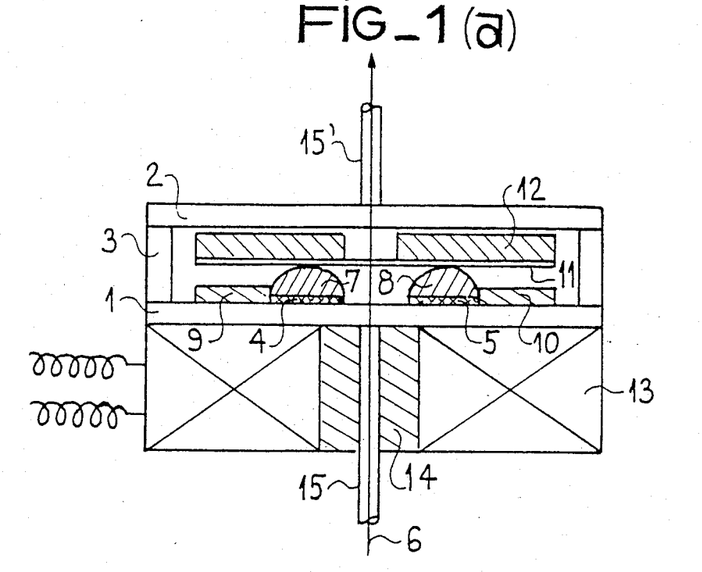
FIGS. 1a and 1b are vertical sections through a first embodiment of the invention, in a rest position and in a working position respectively.

FIG. 1a shows a transparent plate 1 which is a part of a housing having a second transparent plate 2 disposed above the first plate 1 and spaced apart therefrom by a side wall or spacer 3. On the surface of the first plate 1 which is inside the housing, there are two regions 4 and 5 which are wettable by a light-reflecting liquid.

The liquid may be mercury, for example, and said regions 4 and 5 may be rendered wettable by a conventional copper deposition method, eg. vacuum evaporation followed by heat treatment at about 300° C. in the presence of mercury when the housing is sealed.

The wettable regions 4 and 5 are situated on either side of a light-passing region for passing a ray of light 6, but they do not extend over said light-passing region. The first plate 1 is made out of a material, eg. glass, which is not wetted by the chosen liquid. Respective drops 7 and 8 of liquid are received on the wettable regions 4 and 5.

On either side of the wettable regions 4 and 5, there are respective raised regions 9 and 10 which are preferably not wettable by the liquid. Chromium can be used, for example, since it is not wettable by mercury. The raised regions 9 and 10 serve both to guide the liquid and as stops for a moving plate 11. The moving plate 11 is made of optically transparent material, is disposed above the above-mentioned light-passing, wettable, and raised regions, and is free to move towards them or away from them. The plate 11 has a piece of magnetic material 12 (which may be a permanent magnet) securely fixed thereto, and located in a position where it does not interfere with the light ray 6.

A magnetic winding 13 is disposed underneath the first transparent plate 1, and it may be provided with a magnetic core 14 (as shown) in order to increase its efficiency. The magnetic core 14 must have a passage for the light ray 6, and advantageously the passage is fitted with a light-guiding optical fiber 15.

When a current is applied to the winding 13, a magnetic field is set up attracting the plate 11 by means of its magnetic material 12 towards the winding 13. This is the position shown in FIG. 1b, in which the plate 11 flattens the drops 7 and 8 so that they become a single drop 17. The resulting drop 17 is then applied against the light-passing region of the first transparent plate 1.

Figure 1B:
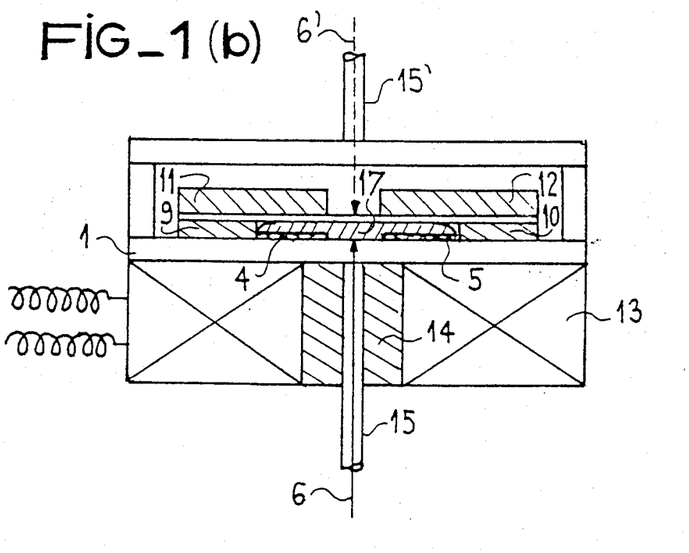

The non-wettable raised regions 9 and 10 serve to push the liquid towards the light-passing region, whereby the two drops 7 and 8 are caused to merge into the single drop 17. The raised regions also act as stops for the moving plate 11. The raised regions are advantageously made by depositing metal under highly controlled conditions using techniques that have been mastered for the manufacture of semiconductors. The thickness of the raised regions 9 and 10 is thus capable of being determined to a high degree of accuracy.

When mercury is used as the liquid, the drops 7 and 8 merging over the light-passing region cause the light ray 6 to be blocked. In particular, the mercury constitutes a plane mirror which serves to reflect the light ray 6 back the way it came. The quality of the mirror formed in this way depends only on the planeness of the plate 1. Excellent plane surfaces can be obtained on glass.

The switch shown in FIGS. 1a and 1b is also effective with a light ray 6' incident on the second plate 2, as shown in dashed lines in FIG. 1b. The reflection then takes place on the moving plate 11 where it comes into contact with the drop 17 of mercury.

Providing the geometry of the drop 17 is such that it is unstable when released by the moving plate 11, it will automatically split back into the two drops 7 and 8 under the effect of surface tension when the magnetic field is removed. In other words, because the moving plate 11 is made of a nonwettable material (eg. glass), the system returns automatically to the position shown in FIG. 1a when the magnetic field is removed, with surface tension providing the necessary return forces.

Other configurations are possible in which the drop 17 is not unstable when the flattening force is removed, and will therefore not split up automatically into two drops on removal of the magnetic field. The particular situation in any given switch depends partially on the quantity of liquid and mostly on the shape of the drop 17 when the moving plate is in its working position (ie. drawn towards the electromagnetic winding 13). These variables are described in greater detail further on.

In either case, the bottom face of the moving plate 11 is preferably not wettable by the liquid, in order to avoid having traces of liquid interfering with the transmission of light when the switch is in its rest position (ie. as shown in FIG. 1a).

If the flattened drop 17 is sufficiently stable not to return with the moving plate 11 when the magnetic attraction ceases, a bistable system can be devised. The magnetic material 12 can be biased in a direction parallel to the axis of the winding 13. Then the moving plate 11 can be drawn towards or repelled from the winding 13 depending on the direction of current flowing therethrough. In such a case a pulse of current in the appropriate direction is sufficient to operate the switch, which will then remain stable in its most recently operated position until a contrary pulse is received.

Figures 2A, 2B, 2C:
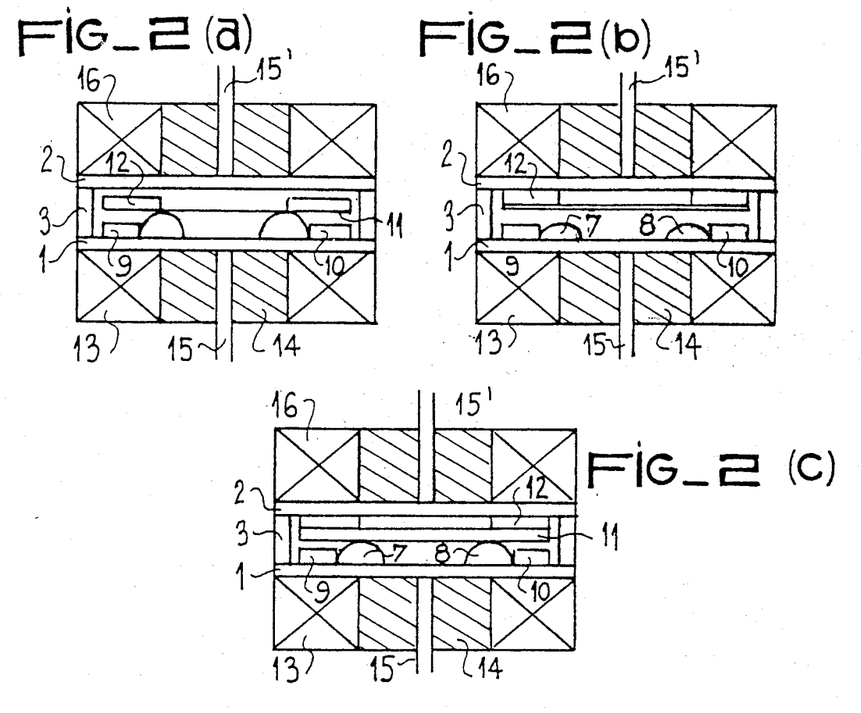
FIGS. 2a, 2b, and 2c are vertical sections through three variants of the first embodiment, all shown in the rest position.

FIG. 2a shows a bistable variant of the FIGS. 1a and 1b switch. This variant uses a second winding 16 on the other side of the switch, ie. next to the second plate 2. A pulse through the winding 13 interrupts the passage of light, and the system remains in this position without any further holding current. A second pulse, but this time through the winding 16, serves to draw the moving plate 11 away from the liquid, thereby enabling the drop 17 to split back into its component parts 7 and 8 which do not interrupt the passage of light through the switch.

FIG. 2b shows a variant which may optionally be bistable. In this variant, when the moving plate 11 is in the rest position, it comes into contact with the second plate 2, but it is then no longer in contact with the liquid. This can be achieved by ensuring that there is always a current flowing in one or other of the windings 13 or 16, or else by replacing the winding 16 with a permanent magnet.

FIG. 2c shows a third variant in which the moving plate 11 comes into contact with the second plate 2 when in the rest position, but also remains in contact with the liquid. This contact with the second plate 2 is positively maintained by an attractive force acting on the moving plate 11 (eg. from a winding or from an permanent magnet) which enables the switch to be completely insensitive to its orientation and not very sensitive to mechanical forces such as vibration to which it may be subjected.

Figures 3A, 3B:
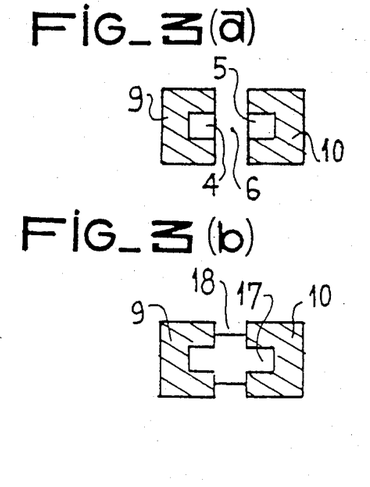
FIGS. 3a and 3b, 4a and 4b, and 5a and 5b, show three configurations of wettable and non-wettable regions in their rest positions and their working positions respectively.

FIG. 3a shows the two surfaces 4 and 5 which are wettable by a light reflecting liquid being symetrically disposed about the path of the light ray 6. The surfaces 4 and 5 are square or rectangular. Each of them is surrounded on three sides other than the side next to the light-passing region, by respective raised regions 9 or 10 which are not wettable by the liquid, but which are thicker than the wettable regions. The raised regions 9 and 10 thus serve to direct the liquid drops 7 and 8 (not shown in this figure) and as stops for the moving plate 11. In FIG. 3b, a single drop 17 extends over each of the wettable regions 4 and 5 and over the intervening space which includes the light-passing region and some of the space or channels 18 between the raised regions 9 and 10. The channels 18 make it easier for the liquid to flow, or rather, they provide room for absorbing excess liquid whereby fairly wide tolerances may be used on the quantity of liquid used. By way of example, a monostable switch can be made by using wettable surfaces 4 and 5 which are 1 mm squares, with the raised regions having outside dimensions of 2×3 mm and a thickness of 0.2 mm. The wettable regions 4 and 5 are separated by a light-passing region which is 0.3 mm across and the drops are 0.3 mm high before being flattened.

Figures 4A, 4B:
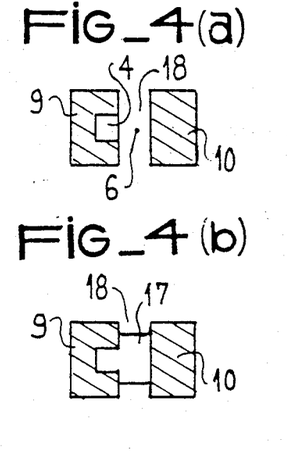

FIG. 4a shows a single wettable region 4 for wetting by a light-reflecting liquid. The region 4 is beside a light-passing region passing a light ray 6. The region 4 is rectangular and is surrounded on three sides by a raised region 9 which is not wettable by the liquid and which is thicker than the wettable region 4. The raised region 9 does not extend along the side nearest to the ray 6. The raised region 9 serves both as a guide for the single drop 17 and as a stop for the moving plate 11. There may be a second raised region 10 on the opposite side of the ray 6. When the switch is in the "off" position, as shown in FIG. 4b, the drop 17 covers the place where the light ray 6 would otherwise pass through the switch, whereas when the switch is in the "on" or rest position, the drop extends only over the wettable region 4.

Figures 5A, 5B:
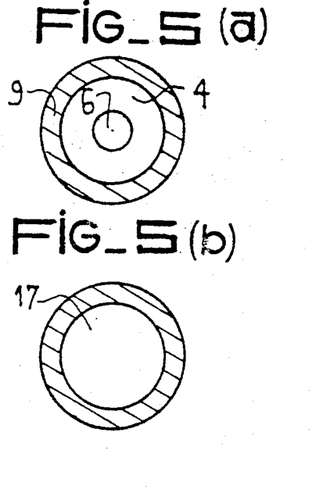

FIG. 5a shows a single wettable region 4 in the form of a ring around a central light-passing region centered on the ray 6. A single raised region 9 extends in the form of an outer ring all the way round the wettable ring 4. The raised region 9 is not wettable by the reflecting liquid. When the switch is in the rest position the liquid remains on the wettable ring region 4, but when the moving plate 11 is lowered onto the liquid, it is flattened into a single circular drop 17 covering the place where the ray 6 used to pass and the raised region 9 serves both to prevent the liquid from spreading out and as a stop for the moving plate. This position is shown in FIG. 5b, in which the light ray 6 is missing since it is blocked by the single drop 17.

Figure 6A:
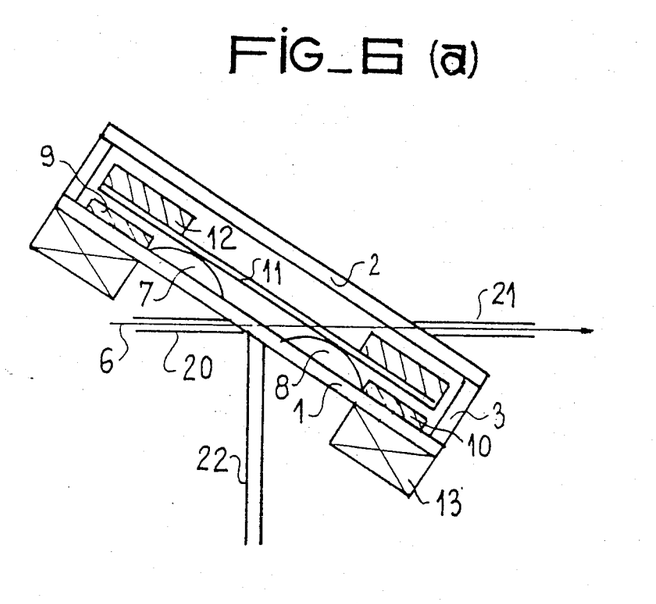
FIGS. 6a and 6b are vertical sections through an embodiment of the invention respectively showing positions for transmitting and for deflecting an incident light ray.

FIG. 6a shows an optical switch in which the incident light ray 6 arrives at an angle of 45° to the first plate 1, eg. along a fiber 20. As drawn in FIG. 6a, the light ray 6 is horizontal while the switch, which is substantially identical to the switch shown in FIGS. 1a and 1b, is at 45° to the horizontal. The switch operates by means of capilary forces rather than by means of gravity, being relatively insensitive to being tilted at an angle, and thus being suitable for operation in many positions. In the rest position shown in FIG. 6a, the light ray 6 passes through the switch and leaves it along the same axis as it arrived, eg. via an optical fiber 21. In the working position shown in FIG. 6b, the ray 6 is deflected through 90° so that it leaves the switch in a vertical direction, eg. via an optical fiber 22.

Figures 7A, 7B:
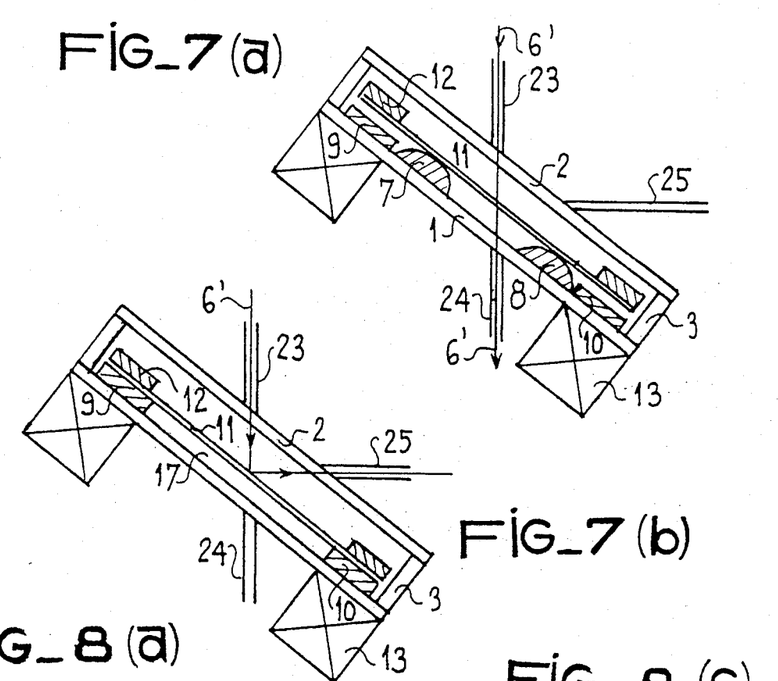
FIGS. 7a and 7b are vertical sections through a variant of the switch shown in FIGS. 6a and 6b.

In FIG. 7a, an incident ray 6' arrives at the second plate 2, eg. along a fiber 23, and while the switch is in the rest position it passes through the switch to leave along the same axis, eg. via a fiber 24. In the working position as shown in FIG. 7b, the moving plate 11 is moved against the raised region 9 and 10 causing a single large drop 17 to be formed over the light passing region of the first plate 1. The ray 6' is thus reflected by the liquid where it comes into contact with the moving plate 11, and is deflected through 90°, leaving the switch horizontally, eg. via an optical fiber 25.

Figures 8A, 8B, 8C, 8D:
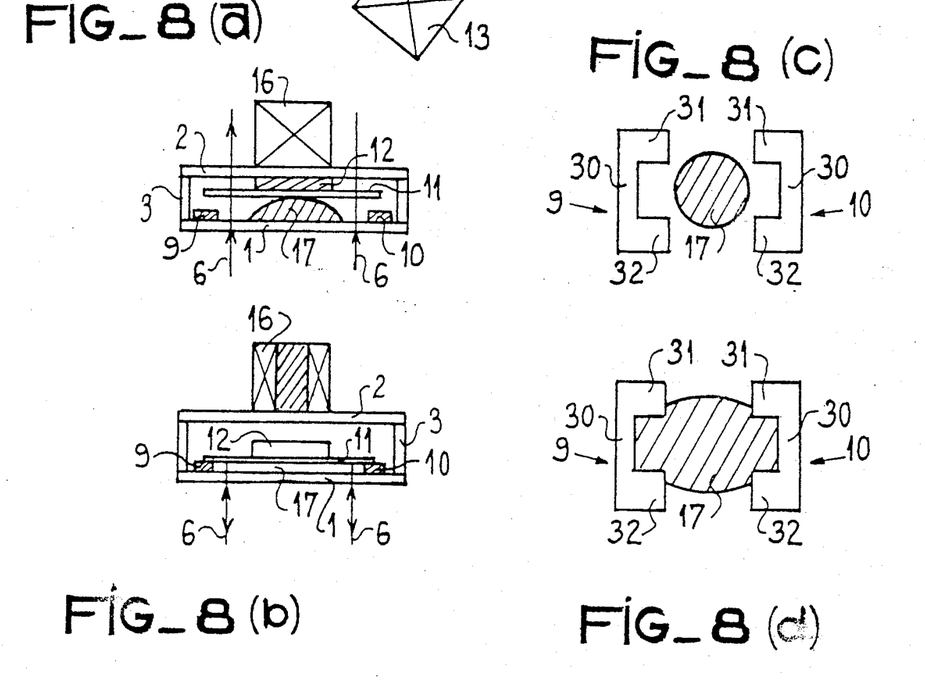
FIGS. 8a to 8d are vertical and horizontal sections through a second embodiment of the invention using a single drop of liquid.

FIG. 8a shows a switch in which the moving plate 11 has magnetic material 12 in the center of the plate. Two light rays 6 pass through the switch when in the rest position on either side of the magnetic material 12 through the periphery of the moving plate 11. In the working position of the switch as shown in FIG. 8b, a single flattened drop 17 serves to reflect both of the rays 6.

FIGS. 8c and 8d show the configuration of the wettable and the raised regions of the switch shown in FIGS. 8a and 8b. In the rest position a single drop 17 occupies the middle of the switch between two rectangular C-shaped raised regions 9 and 10 comprising respective main branches 30 with short top and bottom branches 31 and 32. The light rays 6 pass in between the raised regions 9 and 10 and the single drop 17. In the working position (FIGS. 8b and 8d) the single drop 17 is flattened to fill the empty space between the raised regions, thereby interrupting the light beams 6.

Figure 9A:
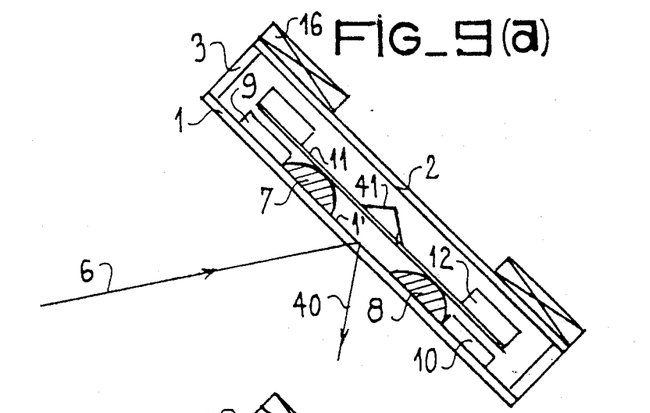
Figure 9B:
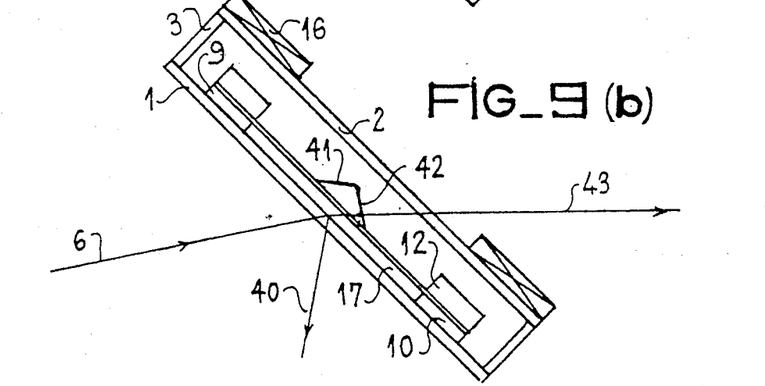

In FIG. 9a, the optical switch employs the phenomenon of total internal reflection, using a transparent liquid of suitable refractive index. Such liquids are generally water based, so that they are capable of wetting glass, with a thin layer of transparent silicone being used to provide a non-wettable surface.

The angle of incidence of the light ray 6 is chosen in such a manner that it is totally internally reflected by the first transparent plate 1, leaving along a ray 40. The liquid is present in the form of drops 7 and 8 and its refractive index is chosen so that when the moving plate 11 is in its working position there is no longer total internal reflection, and at least a portion of the incident ray passes through the flattened drop 17. A prism 41 is disposed on the opposite surface of the moving plate 11 and prevents reflection taking place on the surface of the plate 11 instead. A further prism (not shown) may be placed on the second plate 2 for a similar purpose, if necessary.

It will nonetheless be understood that other contrivances may be used to avoid total internal reflection at unwanted surfaces when the switch is in the working position.

The refractive index of the liquid may be greater than that of the first transparent plate 1, thereby avoiding total internal reflection on the moving plate 11 and the second transparent plate 2 since these plates usually have the same refractive index as the first plate 1.

Alternatively a prism may be used having an angle such that the ray leaving the moving plate 11 does so at an angle which avoids total internal reflection on striking the second transparent plate 2.

There follows a more detailed description of the mechanisms by which optical switches in accordance with the invention operate.

In an optical switch in accordance with the invention, the movement of the liquid is very much under the influence of surface tension forces.

Generally speaking, a drop of liquid tries to reduce its free surface energy as much as possible, which means it tends to be spherical. Any departure from the spherical shape thus requires the application of external energy.

It follows that the shape of the drop when flattened in the working position is unstable, and is not retained after the flattening force is removed. Likewise, the flattened drop 17 splitting back into two drops 7 and 8 takes place because it achieves a reduction in the liquid's total free surface area.

Figure 10:
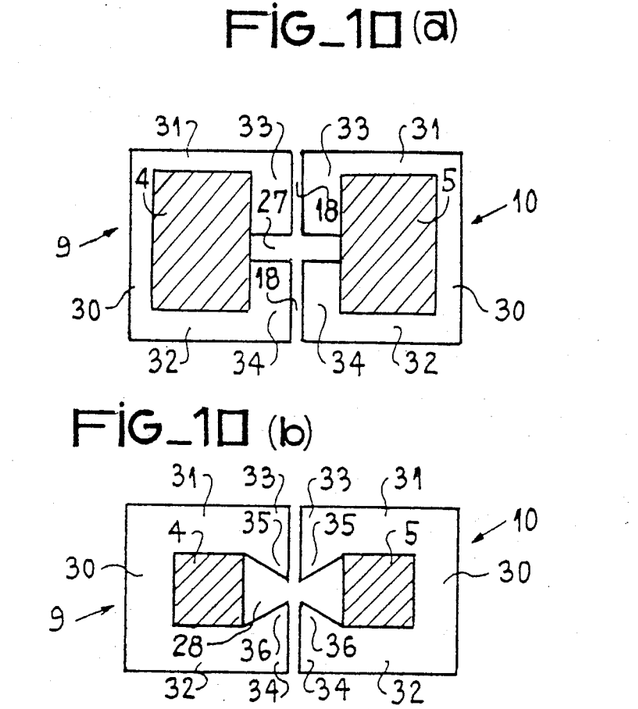
FIGS. 10a, 10b and 11 show various guiding means for drops as they are flattened.

More specifically, FIGS. 10a and 10b show two shapes for the raised regions 9 and 10 which tend to make the flattened drop even more unstable.

In FIG. 10a the regions 9 and 10 are generally in the shape of rectangular Cs in which the top and bottom branches 31 and 32 are extended towards each other by rather pronounced cerifs 33 and 34 respectively. The raised regions thus extend around more than 3½ sides of each wettable region 4 or 5. In between the ends of the cerifs 33 or 34 there is channel 27.

When the working plate 11 is brought down to its working position, the liquid which was previously held on each of the wettable regions 4 and 5 is guided along the channel 27 to meet the liquid coming the other way from the other wettable region. A small side channel 18 extending between corresponding pairs of cerifs 33 or 34 serves as a buffer volume into which the liquid can overflow if the channel 27 and the wettable regions 4 and 5 are full.

As the moving plate 11 moves back to its rest position, surface tension comes into play to reduce the energy of the drop's free surface. However, splitting the drop into two drops would tend to increase the free liquid surface. This effect is minimized by the channel being considerably narrower than the wettable regions 4 and 5, thereby making monostable switching operation possible.

FIG. 10b shows a variant in which the cerifs 33 and 34 taper to points 35 and 36 respectively, so that the channel 27 is transformed to a channel 28 which is constricted in the middle. This shape leaves more room for the surface of the liquid to expand, but there is a minimal area of contact between the two drops of liquid, so the switch still operates as a monostable.

Figure 11:
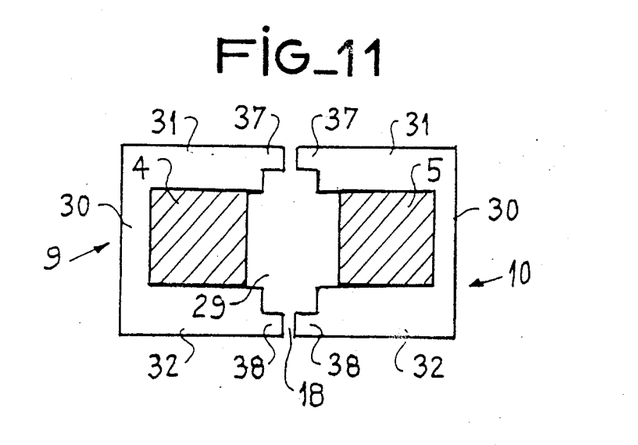

FIG. 11 shows a raised region shape suitable for bistable operation. In this shape, the raised regions 9 and 10 are again C-shaped, but instead of having cerifs 33 and 34, the top and bottom branches 31 and 32 are extended by fingers 37 and 38 respectively which continue in the same direction as their parent branches but which are thinner and leave a larger gap in between. In particular they leave a gap which is broader than the wettable regions 4 and 5. This configuration increases the contact area between the drops. External work must be done on the liquid in order to supply the energy which corresponds to the increase in surface area which takes place when the single drop 17 splits into two drops. This work comes from the energy needed to move the moving plate back from its working position to its rest position.

It should be observed that the width of the non-wettable region in between the wettable regions also plays a part in that drop necking increases with increasing non-wettable width.

Figure 6B:
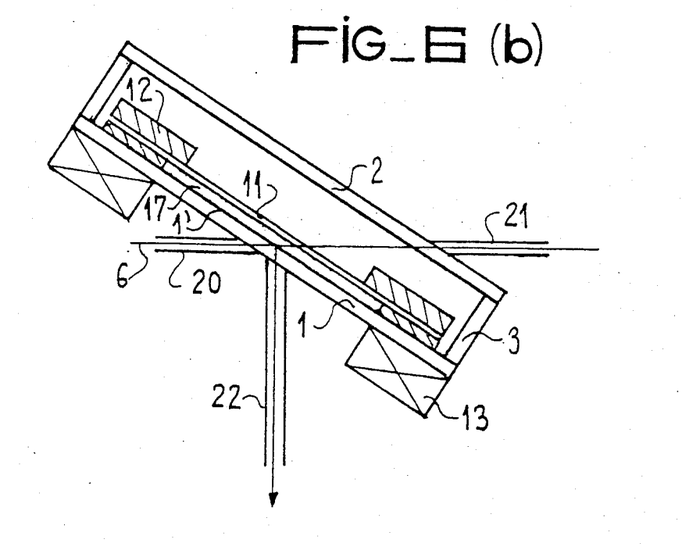
Figure 12:
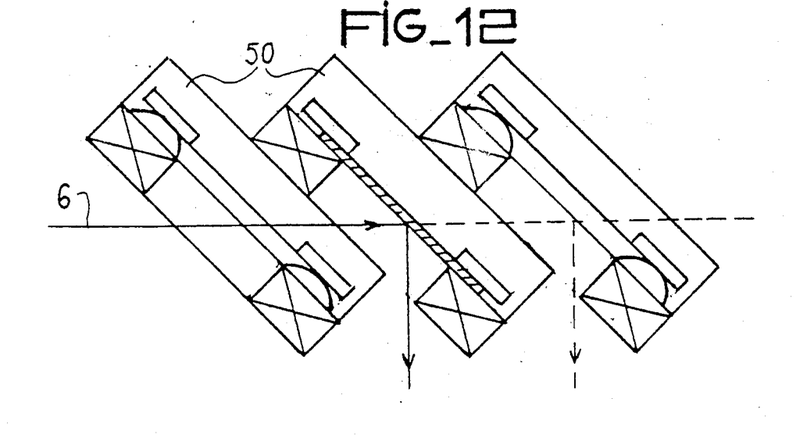
FIG. 12 is a section through a switching matrix in accordance with the invention.

FIG. 12 shows a switching matrix using a plurality of switches in accordance with the invention. Optical switches 50 of the type shown in FIGS. 6a and 6b are disposed one after the other at an angle of 45°, for example, to an incident ray 6. Switching is performed by deflecting the incident ray 6 through 90° at one of the switches along its path.

In embodiments where the liquid is conductive, eg. mercury, and where the wettable regions 4 and 5 are also conductive, eg. copper treated at 300° C. with mercury, the switch may be provided with electrical output terminals in contact with respective ones of the wettable regions 4 and 5. The terminals can then be used to check that the switch is operating correctly, or to discover which way a bistable switch is set. This can be particularly useful in switching matrices. In other words, when the optical switch is in its rest position, no electrical contact exists between the terminals, and when the optical switch is in its working position thereby causing the propagation of the incident light ray to be modified, the terminals are in electrical contact.

The invention is not limited to the embodiments which have been described. All sorts of other means can be devised to move the moving plate so that it flattens the drops of liquid, for example: the magnetic material 12 could be replaced by a piezo-electric component which expands when a voltage is applied across its; or an electrostatically deformable compound could be used. Thus, with reference to FIG. 2c, each portion of magnetic material 12 could be replaced by a piezo-electric component or by an electrostatically deformable component acting between the second transparent plate 2 and the moving plate 11. The windings 13 and 16 would then be unnecessary. Another possibility, based on the embodiment shown in FIGS. 1a and 1b would be to replace the winding 13 by a moving magnet which operates the switch when brought close thereto.

I claim:

1. An optical switch comprising:

a plate having a light-passing region suitable for passing an incident ray of light;

at least one wettable drop-receiving region disposed on the surface of said plate adjacent said light-passing region;

at least one non-wettable raised region disposed on the surface of said plate adjacent said at least one drop-receiving region and disposed away from said light passing region;

at least one drop of liquid received on said at least one wettable drop-receiving region, said at least one drop of liquid having a crown portion which extends above said at least one non-wettable raised region; and a moving member selectively movable between a rest position and a working position, said moving member in said rest position being displaced away from said at least one non-wettable raised region thereby allowing said at least one drop of liquid to be maintained in the shape of at least one droplet by surface tension on said at least one wettable drop receiving region with said crown portion extending above said at least one non-wettable raised region, and said moving member in said working position contacting said at least one non-wettable raised region so as to form a channel region extending across said light-passing region of said plate, said moving member in said working position also engaging with said crown of said at least one drop of liquid to thereby flatten and drive said at least one drop of liquid along said channel and across said light passing region, wherein said flattened at least one drop of liquid is substantially maintained against said light passing region by said moving member and said at least one non-wettable raised region thereby causing the propagation of the incident light ray to be modified by the ray encountering said flattened out at least one drop of liquid.

2. An optical switch according to claim 1, wherein the moving member is a moving plate having a transparent region situated on the path of said light ray.

3. An optical switch according to claim 2, wherein said moving plate has a region of magnetic material thereon, and wherein said switch includes electro-magnetic control means for moving said moving plate between its rest and working positions.

4. An optial switch according to claim 2, wherein said at least one drop of liquid comprises at least two drops of liquid and said transparent region of the moving plate is a central region thereof, and wherein, in its rest position, said plate rests on said at least two drops of liquid situated on either side of said transparent central region.

5. An optical switch according to claim 4, wherein said plate, in its rest position, comes into contact with a second plate which, together with said plate having said wettable drop-receiving region, constitutes a housing around said moving plate.

6. An optical switch according to claim 4, wherein said wettable drop-receiving region is surrounded by a raised region of said plate, said raised region being interrupted by a channel into which the liquid penetrates when the moving member is in the working position.

7. An optical switch according to claim 1, wherein said liquid is a reflecting liquid, and wherein the switch includes means for directing at least one incident light ray perpendicularly to said plate, thereby constituting an optical on/off switch.

8. An optical switch according to claim 1, wherein said liquid is a reflecting liquid, and wherein the switch includes means for directing at least one incident light ray at a given angle other than perpendicularly to said plate, thereby constituting an optical deflector.

9. An optical switch according to claim 1, including means for directing at least one incident light ray at a given angle other than perpendicularly to said plate for total reflection thereon, and wherein said liquid has an index of refraction such that when the moving member is in the working position, at least a portion of the light ray is transmitted.

10. An optical switch according to claim 9, wherein said moving member has a light ray exit face perpendicular to the indicent direction of the light ray.

11. A switch matrix comprising a plurality of optical switches according to claim 1 disposed one after the other along the path of an incident light ray.

12. An optical switch according to claim 1 comprising at least two electrically separated wettable regions, whereby said liquid is a conductive liquid and wherein electrical output terminals are provided which are in contact with respective ones of said at least two electrically separated wettable regions, said wettable regions being conductive, said movable member driving said conductive liquid into contact with both of said two electrically separated wettable regions, whereby the correct operation of the switch can be checked.

* * * * *